Jan. 26, 1937.                G. TABOZZI                2,069,101
                              AERIAL FLARE
                          Filed Oct. 18, 1933
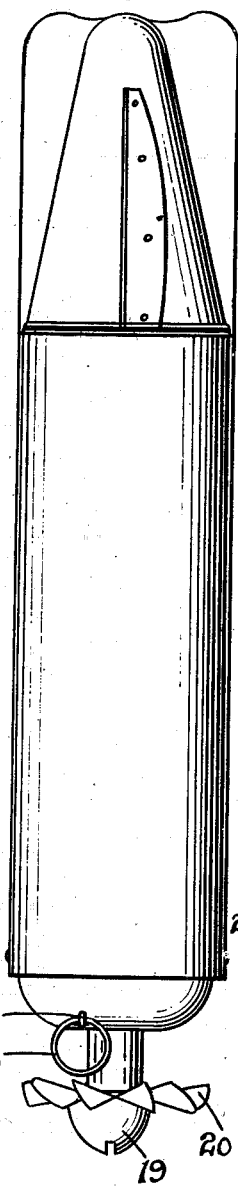
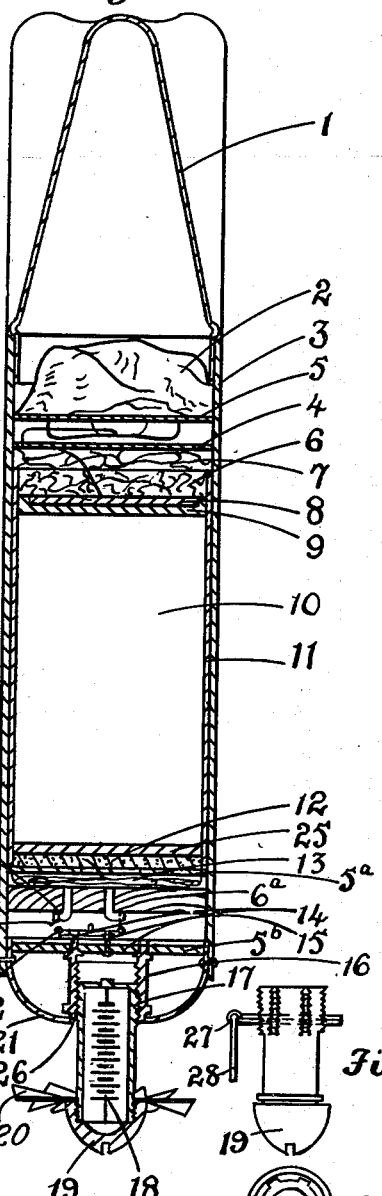
Inventor:

UNITED STATES PATENT OFFICE 2,069,101

AERIAL FLARE

Giacinto Tabozzi, Milan, Italy

Application October 18, 1933, Serial No. 694,130

1 Claim. (Cl. 102—24)

This invention relates to a flare or rocket for use with aeroplanes and the like, and has for its primary object to provide a simple and efficient means for automatically igniting the illuminant after the rocket is dropped from an aeroplane.

A further object of this invention is to provide a rocket or flare in which a parachute connected to the illuminant is simultaneously released with the igniting of the expellant charge.

With these and other objects in view, the invention consists in the combination of a barrel, with a detachable tail cover provided with wings, a parachute inserted into the rear end of the barrel is connected by a cable to a container for an illuminant, a tinder and an expellant charge arranged within the barrel. One end of a wick is embedded in the expellant charge and the opposite end is connected to an igniting means, which latter, is actuated by a threaded propeller shaft when screwed to the innermost position in an internally threaded socket fixed to a cover on the front end of the barrel, said propeller shaft being rotated by means of a propeller keyed thereto when dropped from an aeroplane or the like.

The igniting means may be either electrical or pyrophoric; and a safety locking means is provided for preventing rotation of the propeller shaft when the rocket is stored.

The annexed drawing shows one form of carrying out the invention in which:

Fig. 1 is a longitudinal view of the rocket.

Fig. 2 is a longitudinal section.

Figs. 3 and 4 are an elevation and plan of the arrangement of the special safety catch.

Referring particularly to the said figures: 1 is the cover of the conical tail provided with directing wings, fitted into the rear end of the barrel; 2 is the parachute; 3 is the barrel; 4 and 5 are the dividing discs and crosspieces between which there is a space for containing the cords connected to the edges of the parachute 2; 6 is a wooden cover above which lies the suspension cord connected to the parachute; 8 is a disc arranged in a recess in a disc 9 of non-igniting material, 10 is the active mass of the illuminating device provided below with a bed of special tinder 25, under which there is a bed of black gunpowder 12.

The parts designated by the numerals 7, 9, 10, 25 and 12 are contained in an envelope 11, placed in the barrel 3. Below the mass of black gunpowder 12, is a disc 5a and a wick 13, one end of which is embedded in the gunpowder 12, and the opposite end 23 passing through a cover 6a is formed into a combustible match 24 in contact with an electrical spark produced between the terminals 14, when an electrical circuit is closed as hereinafter set forth.

One of the terminals is mounted upon an insulating disc 15 secured to a cover 21 by means of a ring 5b. Said cover 21 is fixed to front end of the barrel 3 as shown in Fig. 2.

An internally threaded socket 16 interposed between the cover 21 and disc 15 receives a threaded propeller shaft 17 containing an electric battery 18 and a propeller 20 is secured to said shaft 17 by means of a conical nut 19.

A safety locking means is provided for preventing rotation of the propeller shaft 17 when not in use, which consists of a pin 27 provided with a ring shaped handle 28, said pin passes through an aperture 26 formed between the socket 16 and shaft 17

I claim:

An aerial flare comprising a barrel, a detachable tail cover provided with vanes fitted on the rear end of said barrel, a parachute within the rear end of the barrel, a container for an illuminant, a tinder and expellant charge within said barrel, a wick having one end embedded in said expellant charge, a cover fixed to the front end of the barrel, a base plate integral with said cover, an internally threaded socket interposed between said fixed cover and base plate, a hollow threaded propeller shaft screwed into the socket, a propeller keyed to said shaft, a removable safety pin passing through the socket and shaft holding said shaft against rotation, an electric battery in the rear end of said hollow propeller shaft, and an electric sparking means mounted upon the base plate contacting with the free end of said wick and adapted to be electrically connected to said battery on said hollow propeller shaft moving to the innermost position in said socket by rotation of the propeller shaft during the fall of the flare.

GIACINTO TABOZZI.